(12) United States Patent
Lieber et al.

(10) Patent No.: US 8,452,937 B2
(45) Date of Patent: May 28, 2013

(54) MOVING EXECUTABLE CODE FROM A FIRST REGION OF A NON-VOLATILE MEMORY TO A SECOND REGION OF THE NON-VOLATILE MEMORY TO REDUCE READ DISTURB

(75) Inventors: Opher Lieber, Kfar Saba (IL); Menahem Lasser, Kohav-Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 448 days.

(21) Appl. No.: 12/780,149

(22) Filed: May 14, 2010

(65) Prior Publication Data
US 2011/0283051 A1 Nov. 17, 2011

(51) Int. Cl.
*G06F 12/16* (2006.01)
(52) U.S. Cl.
USPC .......................................... 711/165; 714/47.1
(58) Field of Classification Search
None
See application file for complete search history.

(56) References Cited

U.S. PATENT DOCUMENTS

| 5,920,501 | A | 7/1999 | Norman |
| 7,224,607 | B2 | 5/2007 | Gonzalez et al. |
| 7,315,917 | B2 | 1/2008 | Bennett et al. |
| 7,441,067 | B2 | 10/2008 | Gorobets et al. |
| 7,477,547 | B2 | 1/2009 | Lin |
| 7,565,478 | B2 | 7/2009 | Bennett et al. |
| 7,573,773 | B2 | 8/2009 | Lin |
| 2009/0172246 | A1 | 7/2009 | Afriat |
| 2009/0265508 | A1 | 10/2009 | Bennett et al. |

*Primary Examiner* — Kevin Verbrugge
(74) *Attorney, Agent, or Firm* — Toler Law Group, PC (57) ABSTRACT

A data storage device includes a controller and a non-volatile memory coupled to the controller. The non-volatile memory includes executable boot code that is executable by a processor associated with the data storage device. The controller is configured to read a first portion of the executable boot code from a first region of the non-volatile memory, and in response to detecting a condition, move a second portion of the executable boot code in a second region of the non-volatile memory to a third region of the non-volatile memory.

31 Claims, 5 Drawing Sheets

MOVING EXECUTABLE CODE FROM A FIRST REGION OF A NON-VOLATILE MEMORY TO A SECOND REGION OF THE NON-VOLATILE MEMORY TO REDUCE READ DISTURB

FIELD OF THE DISCLOSURE

The present disclosure generally relates to moving executable code stored in a non-volatile memory device.

BACKGROUND

Flash memory devices frequently suffer from a condition called "read disturb." Read disturb is caused by reading a page of flash cells many times without refreshing the block containing the page. When a page is being read from a block, voltages are applied to word lines of the block that are selected to be read and to word lines that are not selected to be read. These applied voltages cause a programming effect in the word lines to which they apply. When multiple read operations are performed (i.e., thousands or tens of thousands of read operations), some of the cells of the non-selected word lines may accumulate enough disturbances to cause a stored value to change. If the cells are single level cells, then non-programmed cells might become programmed. If the cells are multi-level cells, then programmed cells might shift to a higher state and cause bit errors.

Thus, read disturb may corrupt data values in a block of a flash memory. A flash memory may include data that is frequently read and data that is not frequently read. Even the data that is not frequently read may be subject to read disturb. In addition, code stored in cells that are affected by read disturb may not execute because an error correction mechanism of the system may fail to correct the corrupted data values, resulting in a non-bootable memory or host system.

SUMMARY

A data storage device is disclosed that includes a controller and a non-volatile memory coupled to the controller. The non-volatile memory includes first and second portions of executable boot code that is executable by a processor associated with the data storage device. For example, the executable boot code may be executable by the controller or by a processor of a host device when the data storage device is operatively coupled to the host device. The controller is configured to read the first portion of the executable boot code from a first region of the non-volatile memory during a boot process. In response to detecting a condition, the controller moves the second portion of the executable boot code from a second region of the non-volatile memory to a third region of the non-volatile memory. Moving the second portion of the executable boot code reduces read disturb errors caused by repeated reads of the boot code.

DETAILED DESCRIPTION

In many flash based memory systems, the first block or blocks of a flash memory array contain boot code. Boot code includes executable code that is executed by a processor following a power-up or reset. Boot code includes both code that is always executed upon power-up or reset, and code that may or may not execute upon power-up or reset depending on a condition detected at the time of boot. The boot code is accessed and copied from the flash memory array to an external device (e.g., a host device that includes a processor and a Random Access Memory (RAM)) upon power-up or reset of the system. The code may be the boot code of a flash controller that controls the flash memory, or the code may be the boot code of a host processor that executes an application (e.g., a processor of a mobile telephone). In some cases, the flash memory contains boot code for both a flash controller and a host processor.

Flash based memory systems employ address mapping in which logical addresses received from an external host are translated into physical addresses in the flash memory array. However, boot code is usually not subject to such address mapping, and the boot code is kept in dedicated physical locations of the flash memory array. Some systems require a large amount of code other than boot code while active. The amount of code, other than boot code, may exceed the amount of RAM memory space that can be set aside for storing code in the processor's RAM memory. Such systems may employ swapping or "overlays" that allows portions of code that are not required to always be in the RAM to be read into the RAM as needed used for execution. Thus, if a flash controller stores code of a host command for running a test of the memory, there is no need to keep the code to execute the test always available in the RAM. For example, when the controller's always resident code detects a request for a memory test received from the host, it loads the code of the test from the flash memory to the RAM, executes the code of the test, and may discard the code of the test out of the RAM when the test code is no longer needed. In this way, the programs controlling the processor may be larger than the amount of RAM available in the processor.

In any type of system, on each power-up the boot code is read out of the flash memory array. Boot code is rarely changed so the boot code is rarely refreshed. Read disturb effects that accumulate in the associated cells are not removed.

In a swapping system, while resident code is read out only once per power-on session, a swapped portion of code might be read many times during a single power-on session. For example, if controller code handling a data input function is swapped in for each write operation requested by a host, then in a typical power-on session, the code may be read many times, and the read disturb effect may be greater than in the non-swapping case because of the multiple times the code is read.

In both cases described above, over time, errors caused by read disturb may accumulate in a region of the memory that stores the code. Eventually the error correction mechanization of the system will fail to correct such errors, resulting in a non-bootable memory or host system because code that is affected by read disturb may not execute.

A solution to the problem described above is to manage the code in a way that moves the code around the memory space so that the code does not reside in the same location throughout the lifetime of a system. For example, in a system that has swappable portions of code, the swappable portions of the code are moved to a new location of the memory from time to time. The swappable portions of the code may be located by the resident code by using a pointer that points to the address of the resident code in the memory. For example, after each power-up of the system, the controller code may allocate one or more free blocks of the memory and copy a particular swappable portion of the code from its current location in the memory to a newly assigned location in the memory. The pointer that points to the swappable portion of the code is then updated to point to the new location in the memory and the memory space previously occupied by the swappable portion of the code is released for other purposes. In this way, the number of reads performed in a block of memory containing the swapped code is equal to the number of reads performed in the block of memory during a current power-up session instead of a cumulative number of reads for the system during all uses.

Alternatively, the code may not be relocated each time the system is powered-up. For example, one alternative is to count the number of power-up cycles and relocate the code after each N sessions, where N is an integer number, such as 10 or 1,000. Another alternative is to count the number of swapping operations of a swapped code module or the number of executions of a swapped code module and to relocate the code after each M swapping operations or number of executions, with M being an integer number such as 1,000 or 10,000. The number of swapping operations or the number of executions may be stored in non-volatile memory so as to preserve continuity of such numbers over multiple sessions when power may not be supplied to the system. Still another alternative is to trigger a code shifting operation based on time. For example, code may be moved to a new location of the memory after a specified duration of accumulated system operation time, such as after passage of twenty-four hours or one week. Alternatively, the relocation of the code may be done at any other time, such as when the system is idle or at shut-down when moving the code will not affect performance of user functions.

A similar approach may be employed for solving the problem of read disturb with boot code. Non-swappable code that is resident in RAM at execution time may be divided into two portions. The first code to be executed by the processor after power-up may be kept in a fixed, pre-assigned location (e.g., at physical address zero) that is fixed. The rest of the code may be treated as swappable code as previously described, such as by moving the remaining code after every power-up, after a specified number of power-ups, after passage of a specified period of time, etc. Alternate embodiments as described above are also applicable in this case. As a result, the first portion of the code is read out from the same location as many times as there are power-up sessions, while the rest of the code may be read from different locations during different sessions.

Figure 1:
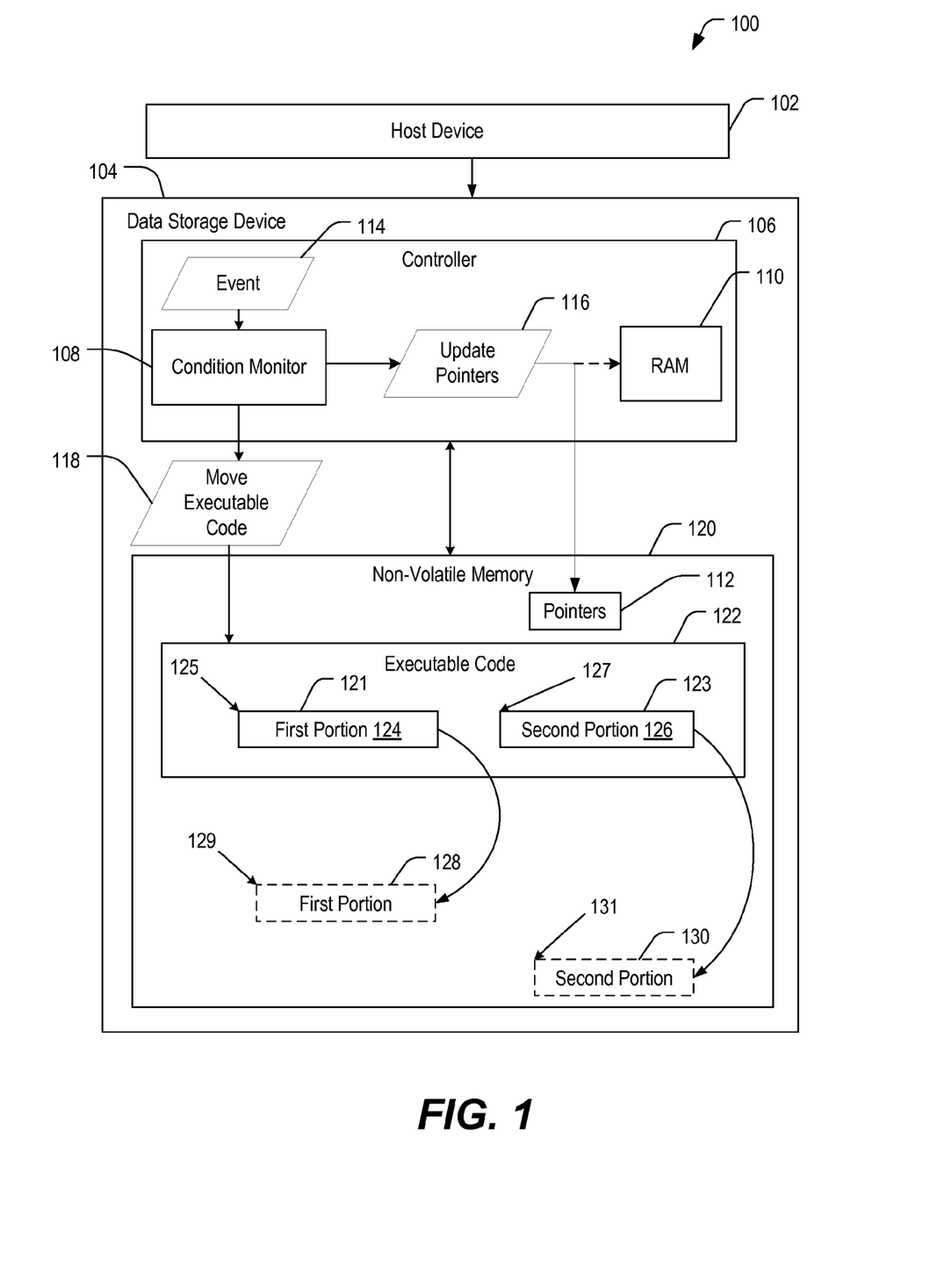
FIG. 1 is a block diagram of an illustrative embodiment of a system configured to move a portion of executable code from a first region at a first location of a memory to a second region at a second location of the memory.

Referring to FIG. 1, an illustrative embodiment of a system to move executable code from a first region at a first location of a non-volatile memory to a second region at a second location of the non-volatile memory is depicted and generally designated 100. The system 100 includes a host device 102 coupled to a data storage device 104. The data storage device 104 includes a controller 106 coupled to a memory 120. The memory 120 may be a non-volatile memory, such as a flash memory.

The non-volatile memory 120 includes executable code 122 and pointers 112. The executable code 122 may be executable by the controller 106, by a processor in the host device 102, or both. The executable code 122 includes a first portion 124 of executable code 122 in a first region 121 at a first location 125 of the non-volatile memory 120 and a second portion 126 of the executable code 122 in a second region 123 at a second location 127 of the non-volatile memory 120. The second portion 126 of the executable code 122 is moveable from the second region 123 at the second location 127 to a third region 130 at a third location 131 of the non-volatile memory 120. Similarly, the first portion 124 of the executable code 122 is moveable from the first region 121 at the first location 125 to a fourth region 128 at a fourth location 129 of the non-volatile memory 120.

The pointers 112 include pointers to addresses in the non-volatile memory 120 that indicate the locations of the first and second portions 124, 126 of the executable code 122. For example, when a portion of the executable code 122 is moved in response to receiving an executable code signal 118 from the condition monitor 108, such as the second portion 126 being moved from the second region 123 to the third region 130, at least one of the pointers 112 is updated with update pointer information 116 to indicate that the second portion 126 of executable code 122 has been moved to the third region 130. Copies of the pointers 112 may also be kept in the RAM 110 to speed up accessing the pointers.

The controller 106 includes a condition monitor 108 and a local memory, such as a Random Access Memory (RAM) 110. The condition monitor 108 is configured to receive event information 114, such as a power-up event, and to monitor conditions that may cause read disturb.

In operation, the controller 106 is configured to read the first portion 124 of the executable code 122 from the first region 121 at the first location 125 of the non-volatile memory 120. In response to detecting a condition at the condition monitor 108, the controller 106 is configured to move the second portion 126 of the executable code 122 from the second region 123 to the third region 130 at the third location 131. Alternatively, in response to detecting a condition at the condition monitor 108, such as the first portion 124 of the executable code 122 being read from the non-volatile memory 120, the controller 106 may be configured to move the first portion 124 of the executable code 122 from the first region 121 to the fourth region 128.

Moving one or more portions of the executable code 122 in the non-volatile memory 120 to another region of the non-volatile memory 120 reduces a number of repetitive read operations to any single region of the non-volatile memory 120 due to execution of the executable code 122. As a result, read disturb effects caused by reading the executable code 122 may be reduced as compared to systems where executable code remains in a single region of memory.

Figure 2:
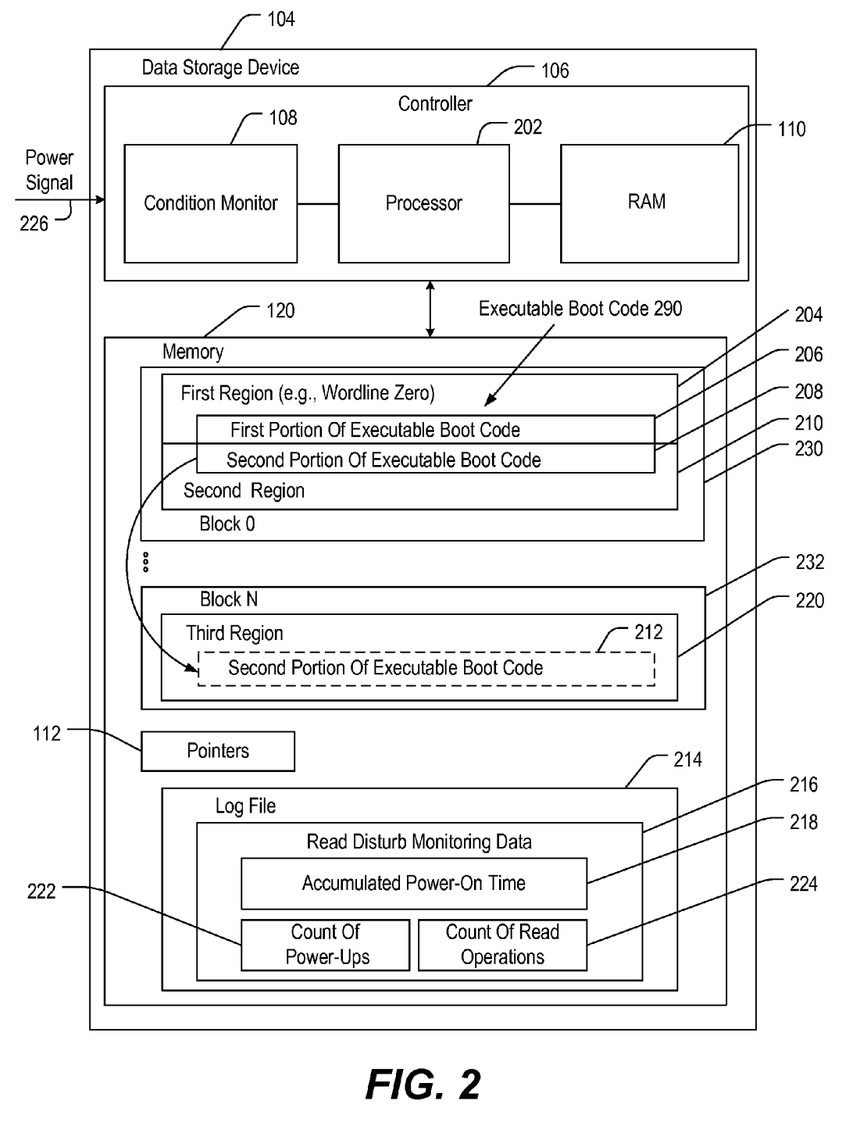
FIG. 2 is a block diagram of an illustrative embodiment of a data storage device configured to move a second portion of executable boot code from a second region of the memory to a third region of the memory.

Referring to FIG. 2, an illustrative embodiment of a data storage device 104 is depicted. The data storage device 104 includes the controller 106 coupled to the memory 120. The memory 120 may be a non-volatile memory, such as a flash memory. The controller 106 is configured to receive a power signal 226 and includes the condition monitor 108, a processor 202, and the Random Access Memory (RAM) 110. The power signal 226 may be a power-up signal or a power-down signal.

The memory 120 includes multiple blocks, illustrated as block zero 230 to block N 232. Block zero 230 is illustrated as having a first region 204 and a second region 210. The memory 120 may be arranged to have a physical address space that extends from an address zero at a first wordline (e.g., wordline zero) in the first region 204 of block zero 230 to a last wordline in block N 232. The memory 120 also includes executable boot code 290. A first portion 206 of the executable boot code 290 is in the first region 204 and a second portion 208 of the executable boot code 290 is in the second region 210.

The memory 120 further includes the pointers 112 and a log file 214. The log file 214 includes read disturb monitoring data 216. The read disturb monitoring data 216 includes accumulated power-on time 218, a count of power-ups 222, and a count of read operations 224.

The first portion 206 of the executable boot code 290 is executable by the controller 106. The controller 106 is configured to read the first portion 206 of the executable boot code 290 from the first region 204 of the memory 120. For example, upon detecting a power-up event, the processor 202 may boot by reading and executing the executable code 290 beginning with the first portion 206. After executing the first portion 206, the boot process may continue with execution of the second portion 208 of the executable boot code 290.

The controller 106 is also configured to, in response to detecting a condition, move the second portion 208 of the executable boot code 290 to another region of the memory 120 that is non-contiguous with the first region 204. For example, the controller 106 may move the second portion 208 of executable boot code 290 to a third region 220 of the memory 120 in block N 232. Block N 232, which contains the third region 220, may be non-contiguous to block zero 230, which contains the first region 204.

As an example, the condition monitor 108 may be configured to detect a power-up condition of the controller 106 and of the memory 120. In response to the power signal 226 indicating the power-up condition, the controller 106 may move the second portion 208 of the executable boot code 290 in the second region 210 of the memory 120 to the third region 220 of the memory 120. For example, after a power-up of the data storage device 104 is indicated by the power signal 226, the controller 106 may allocate the block N 232 of the memory 220 and copy the second portion 208 of the executable boot code 290 from its location in the second region 210 of the memory 120 to the third region 220 of the memory 120. A pointer within the pointers 112 in memory 120 that points to the location of the second portion 208 of executable boot code may be updated to point to the new location of the moved second portion 212 in the third region 220. The portion of the second region 210 that contained the second portion 208 of the executable boot code 290 may be released to be used for another purpose.

As another example, the condition monitor 108 may be configured to detect a power-down condition indicated by the power signal 226. In response to detecting the power-down condition, the controller 106 may be configured to move the second portion 208 of the executable boot code from the second region 210 of the memory 120 to the third region 220 of the memory 120. After moving the second portion 208 of the executable boot code 290 from the second region 210 of the memory 120 to the third region 220 of the memory 120, the controller 106 may read the moved second portion 212 of the executable boot code 290 from the third region 220 in response to a power-up event.

The first portion 206 of the executable boot code 290 may be stored in a fixed, pre-assigned location, such as physical address zero that does not change. For example, the first portion 206 of the executable boot code 290 may reside within the first region 204 of the memory 120. The first region 204 may reside in the first block (e.g., block zero 230), and the first block may have address zero of the memory 120. The first region 204 may reside in a single wordline of the memory 120, such as wordline zero of the first block (e.g., block zero 230) of the memory 120.

An alternative to moving the second portion 208 of the executable boot code 290 during each power-up session is to count a number of power-up cycles of the memory 120 and in response to the condition monitor 108 determining that the number of power-up cycles exceeds a threshold, relocating or moving the second portion 208 of the executable boot code 290. For example, a count of power-up cycles or events, such as the count of power-ups 222, may be stored in the log file 214. In response to the number of power-up events exceeding a threshold number, the second portion 208 of the executable boot code 290 may be moved from the second region 210 of the memory 120 to the third region 220 of the memory 120.

Another alternative to moving the second portion 208 of the executable boot code 290 during each power-up session is to count a number of read operations of the second portion 208 of the executable boot code 290, and in response to the condition monitor 108 detecting the number of read operations exceeding a threshold, moving the second portion 208 of the executable boot code 290. For example, a count of read operations of the second portion 208 of the executable boot code 290, such as the count of read operations 224, may be stored in the log file 214. Alternatively, the count of read operations may be stored in the RAM 110 of the controller 106. In response to the number of read operations exceeding a threshold number, the second portion 208 of the executable boot code 290 may be moved from the second region 210 of the memory 120 to the third region 220 of the memory 120. It should be noted that the number of read operations of the second portion of the executable boot code may be different from the number of power-up events. This is because certain portions of boot code may not execute in some power-up sequences according to conditions detected at the time of boot. Also, certain portions of boot code may be read multiple times during the power-up sequence.

Another alternative to moving the second portion 208 of the executable boot code 290 during each power-up session is to determine an accumulated power-on time of the memory 120 and to move the second portion 208 of the executable boot code 290 in response to the condition monitor 108 detecting that the accumulated power-on time reaches or exceeds a threshold. For example, an accumulated power-on time 218 may be stored in the log file 214. In response to the accumulated power-on time of the memory 120 exceeding a threshold, the second portion 208 of the executable boot code 290 may be moved from the second region 210 of the memory 120 to the third region 220 of the memory 120.

During power-up, the controller 106 reads the first portion 206 of the executable boot code and in response to detecting a condition, moves the second portion 208 of the executable boot code 290 from the second region 210 of the memory 120 to the third region 220 of the memory 120. The condition may include a power event, such as a power-up event or a power-down event of the memory 120. Alternatively, the condition may include a count of power-up events exceeding a threshold number of power-up events or a count of power-down events exceeding a threshold number of power-down events. Alternatively, the condition may include a count of read operations of the second portion 208 of the executable boot code 290 exceeding a threshold number. Alternatively, the condition may include an accumulated power-on time of the non-volatile memory 120 exceeding a threshold. After the second portion 208 of the executable boot code 290 is moved from the second region 210 of the memory 120 to the third region 220 of the memory 120, the controller 106 may be configured to read the moved second portion 212 of the executable boot code 290 from the third region 220 of the memory 120 in response to a power-up event.

As described with reference to FIG. 2, portions of the executable boot code 290 are moved within the memory 120 so that the portions of the executable boot code 290 do not reside in the same memory location throughout the lifetime of the data storage device 200. Moving one or more portions of the executable boot code 290 reduces reading of the same block or blocks of memory and thereby may reduce errors that may be caused by read disturb.

Figure 3:
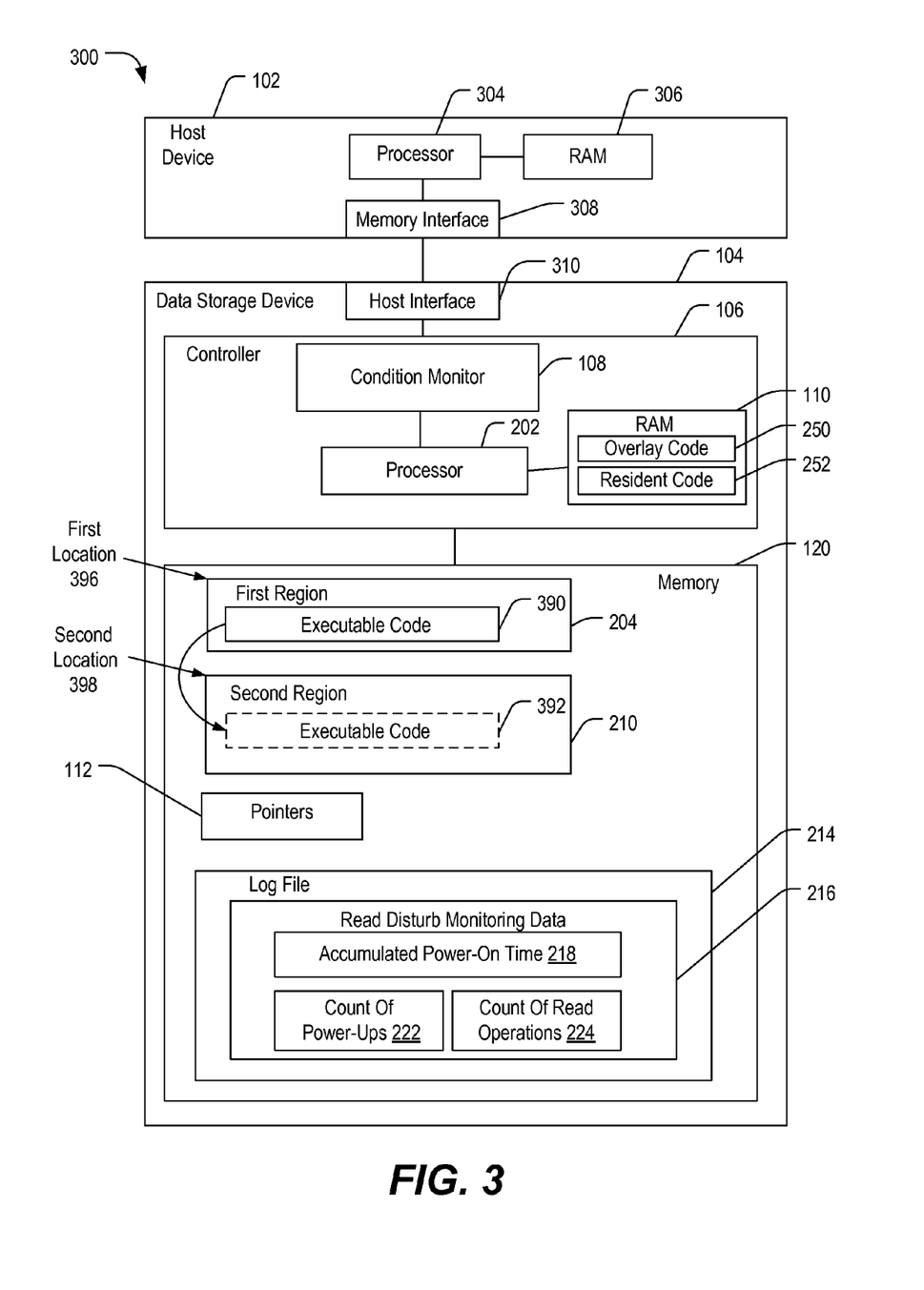
FIG. 3 is a block diagram of an illustrative embodiment of a system configured to move executable code from a first region at a first location of the memory to a second region at a second location of the memory.

Referring to FIG. 3, an illustrative embodiment of a system configured to move executable code 390 from the first region 204 of the memory 120 to the second region 210 of the memory 120 is depicted and generally designated 300. The system 300 includes the host device 102 coupled to the data storage device 104 via a memory interface 308. The host device 102 includes a processor 304 and a memory, such as a Random Access Memory (RAM) 306.

The host device 102 is configured to send messages, such as commands, data, or any combination thereof, to the data storage device 104 and to receive messages via the memory interface 308. The host device 102 may include an electronic device, such as a computer, a mobile phone, a personal digital assistant (PDA), a gaming device, a communication device, a multimedia player device, any other device adapted to communicate with one or more memory devices, or any combination thereof.

The data storage device 104 includes the controller 106 coupled to the memory 120. The controller 106 includes the condition monitor 108, the processor 202, and the Random Access Memory (RAM) 110. The RAM 110 includes overlay code 250 and resident code 252. The condition monitor 108 is configured to monitor conditions that effect read disturb.

The memory 120 includes the executable code 390 stored in the first region 204 at a first location 396 of the memory 120. The executable code 390 is moveable from the first region 204 at the first location 396 of the memory 120 to a second region 210 at a second location 398 of the memory 120. The memory 120 further includes the pointers 112 and the log file 214. The pointers 112 include pointers to addresses in the memory 120 that indicate the location of the executable code 390. The log file 214 includes the read disturb monitoring data 216 including the accumulated power-on time 218, the count of power-ups 222, and the count of read operations 224.

The executable code 390 may be executable by a processor associated with the data storage device 104. For example, the executable code 390 or a portion of the executable code 390 may be executable by the processor 202 or by the processor 304 when the data storage device 104 is operatively coupled to the host device 102. As another example, a portion of the executable code 390 may be executable by the processor 202 and another portion may be executable by the processor 304.

The resident code 252 is code that remains in the RAM 110 while the processor 202 is operational. The overlay code 250 is code that may be loaded into the RAM 110 but need not remain in the RAM 110. For example, the overlay code 250 may be "swapped" for other code to be executed by the processor 202 when the RAM 110 is not large enough to store all executable code as resident code 252.

The resident code 252 may include the executable code 390 or a portion of the executable code 390. For example, the resident code 252 may include non-boot code that is stored in the memory 120 as the executable code 390. As another example, the resident code 252 may include boot code, a first portion of which remains at wordline zero, as described in FIG. 2, and a second portion of which is included in the executable code 390. The resident code 252 may be provided to a processor, such as the processor 202, associated with the data storage device 200 during each boot event of the processor 202 and may remain continuously accessible to the processor 202 during operation.

Alternatively, or in addition, the overlay code 250 may include all or a portion of the executable code 390. Because the overlay code 250 may be read from the memory 120 multiple times during each operational period of the processor 202, as opposed to boot code, which may be read a single time at each power up, the overlay code 250 may be susceptible to an increased read disturb effect as compared to the resident code 252. Thus, the overlay code 250 may beneficially be included in the executable code 390 that is relocated in response to detecting events that may be associated with read disturb effects.

The controller 106 is configured to read the executable code 390 from the first region 204 at the first location 396 of the memory 120 and, in response to detecting a condition, move the executable code 390 to the second region 210 at the second location 398 of the memory 120, where the second location 398 is different from the first location 396. The condition may be one of an accumulated power-on time of the memory 120, a power-up event of the memory 120, and a count of power-up events exceeding a threshold number of power-up events of the memory 120.

For example, the controller 106 may be configured to receive a power-up signal. The condition monitor 108 may be configured to detect a power-up condition of the controller 106 and of the memory 120. In response to detecting the power-up condition, the controller 106 may move the executable code 390 from the first region 204 at the first location 396 of the memory 120 to the second region 210 at the second location 398 of the memory 120. After moving the executable code 390 from the first region 204 to the second region 210, the controller 106 is configured to read the moved executable code 392 from the second region 210 in response to a power-up event.

An alternative to moving the executable code 390 during each power-up session is to count a number of power-up cycles of the memory 120 and in response to the condition monitor 108 determining that the count of power-ups 222 exceeds a threshold, relocating or moving the executable code 390. Another alternative to moving the executable code 390 during each power-up session is to count a number of read operations of the executable code 390, and in response to the condition monitor 108 detecting the count of read operations 224 exceeds a threshold, moving the executable code 390. Another alternative to moving the executable code 390 during each power-up session is to determine an accumulated power-on time 218 of the memory 120, and to move the executable code 390 in response to the condition monitor 108 detecting that the accumulated power-on time 218 reaches or exceeds a threshold.

Although the read disturb monitoring data 216 is illustrated as including each of the accumulated power-on time 218, the count of power-ups 222, and the count of read operations 224, in other embodiments the read disturb monitoring data 216 may include zero, one or two of the accumulated power-on time 218, the count of power-ups 222, and the count of read operations 224.

Figure 4:
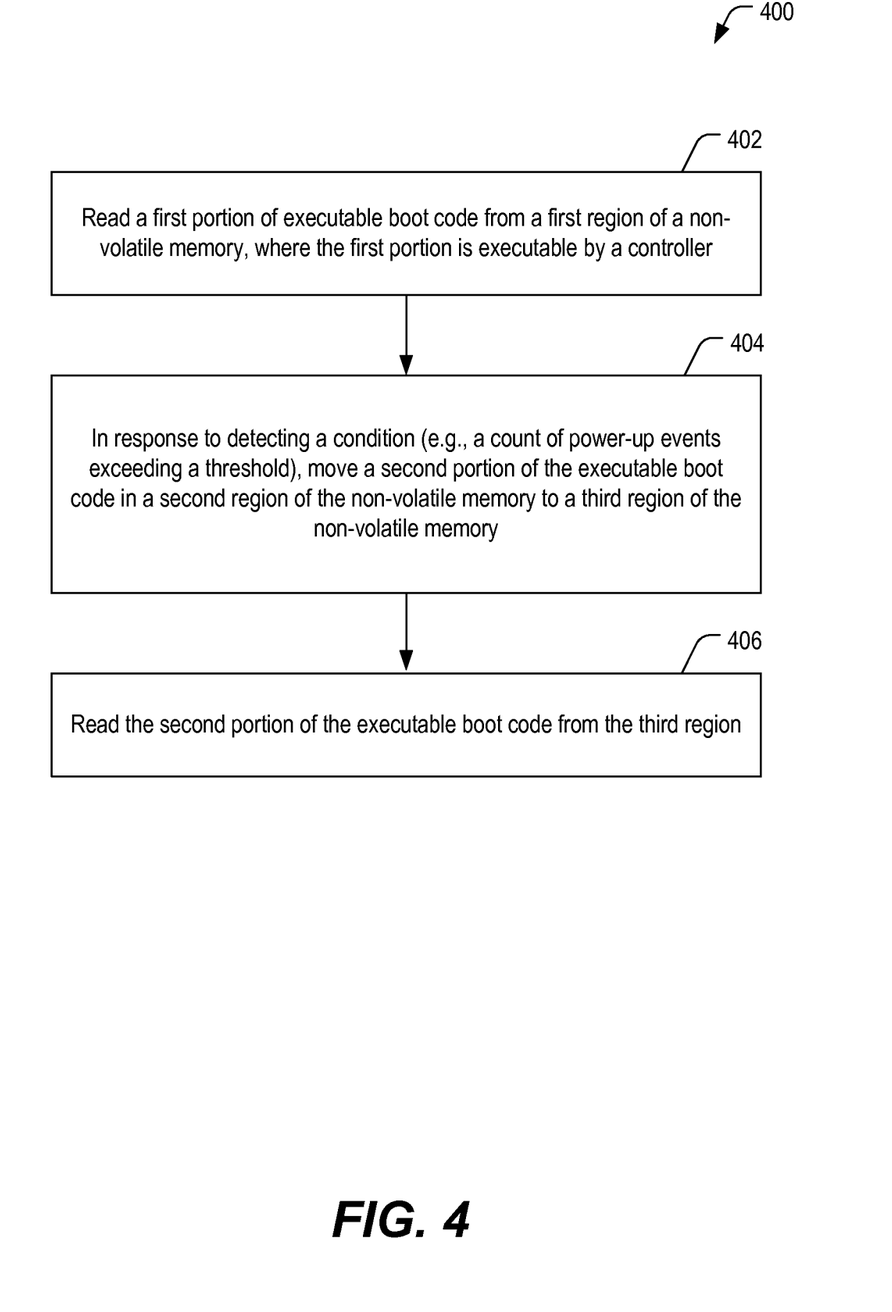
FIG. 4 is a flow diagram of an illustrative embodiment of a method of moving executable boot code from a first region of memory to another region of the memory.

FIG. 4 is a flow diagram of an embodiment of a method of moving executable boot code from a first region of a memory to another region of the memory and is generally designated 400. The method may be performed by a data storage device, such as the data storage device 104 of FIG. 1 or FIG. 2.

A first portion of executable boot code is read from a first region of a non-volatile memory, at 402. For example, the first portion of executable boot code may be the first portion 206 of the executable boot code 290 of FIG. 2, the first region may be the first region 204 of FIG. 2, and the non-volatile memory may be the memory 120 of FIG. 2. In response to detecting a condition, such as a count of power-up events reaching or exceeding a threshold, a second portion of the executable boot code in a second region of the non-volatile memory is moved to a third region of the non-volatile memory, where the third region of the non-volatile memory is non-contiguous to the first region, at 404. For example, the second portion of the executable boot code may be the second portion 208 of the executable boot code 290 of FIG. 2, the second region of the non-volatile memory may be the second region 210 of the memory 120 of FIG. 2, and the third region of the non-volatile memory may be the third region 220 of the memory 120 of FIG. 2. The second portion of the executable boot code is read from the third region of the non-volatile memory, at 406. For example, the second portion of the executable boot code may be the moved second portion 212 of the executable boot code 290 of FIG. 2, and may be read from the third region 220 in response to a later power-up event.

Figure 5:
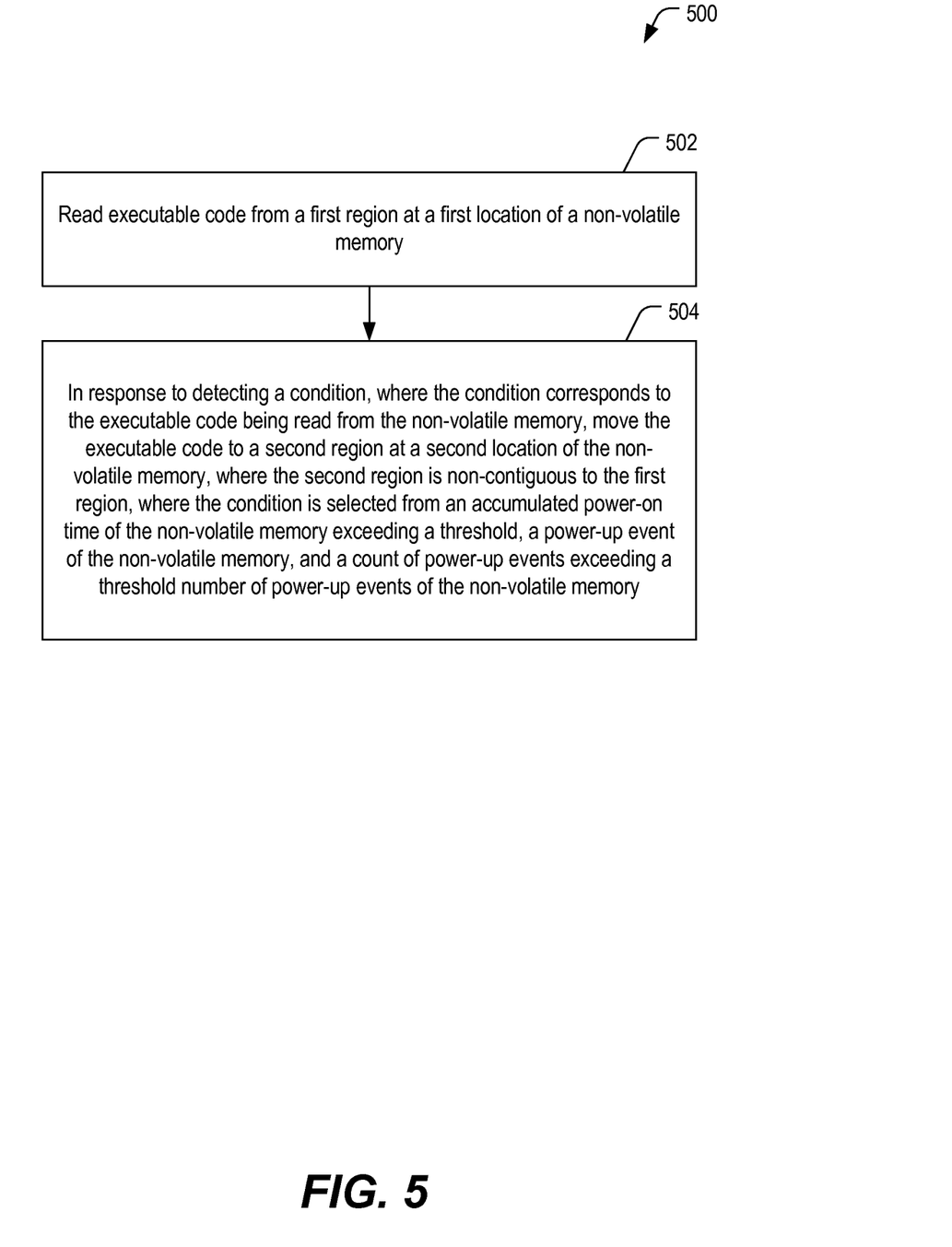
FIG. 5 is a flow diagram of an illustrative embodiment of a method of moving executable code from a first region of memory to a second region of the memory.

FIG. 5 is a flow diagram of an illustrative embodiment of a method of moving executable code from a first region of a memory to a second region of the memory and is generally designated 500. The method may be performed by a data storage device, such as the data storage device 104 of FIG. 3.

Executable code is read from a first region at a first location of a non-volatile memory, at 502. For example, the executable code may be the executable code 390 of FIG. 3, the first region may be the first region 204 of FIG. 3, and the non-volatile memory may be the memory 120 of FIG. 3. In response to detecting a condition, such as a power-up event, an accumulated power-on time of the non-volatile memory exceeding a threshold, or a count of power-up events exceeding a threshold number of power-up events, the executable code is moved to a second region at a second location of the non-volatile memory, where the second region is non-contiguous to the first region, at 504. For example, the second region of the non-volatile memory may be the second region 210 of the memory 120 of FIG. 3.

Moving the executable code in the memory to another region of the memory reduces a number of repetitive read operations to any single region of the memory due to execution of the executable code. As a result, read disturb effects caused by reading the executable code may be reduced as compared to systems where executable code remains in a single region of memory.

Although various components depicted herein are illustrated as block components and described in general terms, such components may include one or more microprocessors, state machines, or other circuits configured to enable the data storage device 104 of FIGS. 1-3 to perform the particular functions attributed to such components, or any combination thereof. For example, the controller 106 of FIGS. 1-3 may represent physical components, such as hardware controllers, state machines, logic circuits, or other structures to enable the data storage device 104 of FIGS. 1-3 to move executable code within a non-volatile memory in response to detecting conditions that may cause read disturb.

For example, the condition monitor 108 may be implemented using a microprocessor or microcontroller programmed to determine whether an event has occurred, such as a power-up event, a power-down event, a count of read operations exceeding a threshold number, or an accumulated power-on time exceeding a threshold. In a particular embodiment, the condition monitor 108 of FIG. 1 includes executable instructions that are executed by a processor, and the instructions are stored at the memory 120. Alternatively, or in addition, executable instructions that are executed by a processor that may be included in the condition monitor 108 may be stored at a separate memory location that is not part of the memory 120, such as at the RAM 110 or at a read-only memory (ROM) (not shown).

In a particular embodiment, the data storage device 104 may be a portable device configured to be selectively coupled to one or more external devices. For example, the data storage device 104 may include a memory card, such as a Secure Digital SD® card, a microSD® card, a miniSD™ card (trademarks of SD®-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.).

However, in other embodiments, the data storage device 104 may be attached or embedded within one or more host devices, such as within a housing of a portable communication device. For example, the data storage device 104 may be within a packaged apparatus such as a wireless telephone, personal digital assistant (PDA), gaming device or console, portable navigation device, or other device that uses internal non-volatile memory. In a particular embodiment, the data storage device includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:
1. A data storage device comprising:
a controller; and
a non-volatile memory coupled to the controller, the non-volatile memory including a first portion of executable boot code, wherein the first portion of the executable boot code is executable by the controller, wherein the controller is configured to:
read the first portion of the executable boot code from a first region of the non-volatile memory; and
in response to detecting a condition, move a second portion of the executable boot code in a second region of the non-volatile memory to a third region of the non-volatile memory, wherein the second portion of the executable boot code is unread by the controller prior to the controller moving the second portion of the executable boot code from the second region to the third region.

2. The data storage device of claim 1, wherein the condition comprises a power-up event of the non-volatile memory.

3. The data storage device of claim 1, wherein the controller is configured to store a count of power-up events, and wherein the condition comprises the count exceeding a threshold number of power-up events.

4. The data storage device of claim 1, wherein the condition comprises a count of read operations of the second portion of the executable boot code exceeding a threshold number.

5. The data storage device of claim 1, wherein the condition comprises an accumulated power-on time of the non-volatile memory exceeding a threshold.

6. The data storage device of claim 1, wherein the condition comprises a power-down event of the non-volatile memory.

7. The data storage device of claim 1, wherein after moving the second portion to the third region, the controller is configured to read the second portion of the executable boot code from the third region in response to a power-up event.

8. The data storage device of claim 1, wherein the second portion of the executable boot code is executable by at least one of the controller and a host processor.

9. The data storage device of claim 1, wherein the first region resides within a first block of the non-volatile memory having address zero.

10. The data storage device of claim 9, wherein the first region resides within a single wordline of the non-volatile memory.

11. The data storage device of claim 10, wherein the first region is located at wordline zero of the first block of the non-volatile memory.

12. The data storage device of claim 1, wherein the first portion includes resident boot code that is provided to a processor associated with the data storage device during each boot event of the processor and that remains continuously accessible to the processor during operation.

13. The data storage device of claim 1, wherein the second region further comprises overlay code and wherein the controller is configured to move the overlay code with the second portion of the executable boot code to the third region of the non-volatile memory.

14. A method comprising:
at a data storage device with a controller and a non-volatile memory, performing:
reading a first portion of executable boot code from a first region of the non-volatile memory, wherein the first portion is executable by the controller; and
in response to detecting a condition, moving a second portion of the executable boot code in a second region of the non-volatile memory to a third region of the non-volatile memory, wherein the second portion of the executable boot code is unread by the controller prior to the controller moving the second portion of the executable boot code.

15. The method of claim 14, wherein the third region is non-contiguous to the first region.

16. The method of claim 14, wherein the non-volatile memory is a flash memory.

17. The method of claim 14, wherein the condition comprises a power-up event of the non-volatile memory.

18. The method of claim 14, further comprising storing a count of power-up events, wherein the condition comprises the count exceeding a threshold number of power-up events of the non-volatile memory.

19. The method of claim 14, wherein the condition comprises a count of read operations of the second portion of the executable boot code exceeding a threshold number.

20. The method of claim 14, wherein the condition comprises an accumulated power-on time of the non-volatile memory exceeding a threshold.

21. The method of claim 14, wherein the executable boot code comprises processor executable instructions that are executed by a processor of the controller upon detecting a power-up event.

22. The method of claim 14, wherein moving the second portion includes updating a pointer to indicate the second portion is at the third region.

23. The method of claim 22, further comprising reading the second portion of the executable boot code from the third region.

24. A data storage device comprising:
a non-volatile memory including executable code, wherein the executable code is executable by a processor associated with the data storage device; and
a controller configured to:
read the executable code from a first region at a first location of the non-volatile memory; and
in response to detecting a condition, wherein the condition corresponds to the executable code being read from the non-volatile memory, move the executable code to a second region at a second location of the non-volatile memory, wherein the executable code comprises uncorrupted data values, wherein the second location is different from the first location, and wherein the condition is selected from the group consisting of:
an accumulated power-on time of the non-volatile memory exceeding a threshold;
a power-up event of the non-volatile memory; and
a count of power-up events exceeding a threshold number of power-up events of the non-volatile memory.

25. The data storage device of claim 24, wherein after moving the executable code, the controller is configured to read the executable code from the second region in response to a power-up event.

26. The data storage device of claim 24, wherein the controller comprises the processor.

27. The data storage device of claim 24, wherein the data storage device is configured to be operatively coupled to a host device that includes the processor.

28. A method comprising:
at a data storage device with a controller and a non-volatile memory, the non-volatile memory comprising executable code that is executable by a processor associated with the data storage device:
reading the executable code from a first region at a first location of the non-volatile memory; and
in response to detecting a condition, wherein the condition corresponds to the executable code being read from the non-volatile memory, moving the executable code to a second region at a second location of the non-volatile memory, wherein the executable code comprises uncorrupted data values, wherein the second location is different from the first location, and wherein the condition is selected from the group consisting of:

an accumulated power-on time of the non-volatile memory exceeding a threshold;
a power-up event of the non-volatile memory; and
a count of power-up events exceeding a threshold number of power-up events of the non-volatile memory.

29. The method of claim 28, wherein the executable code comprises executable boot code, and wherein the condition comprises exceeding a threshold number of read operations of the executable boot code.

30. The method of claim 28, further comprising storing a count of power-up events.

31. The data storage device of claim 1, wherein the first region of the non-volatile memory is a fixed, pre-assigned location.

* * * * *